United States Patent [19]

Matsumoto et al.

[11] 4,415,274
[45] Nov. 15, 1983

[54] STEP MOTOR

[75] Inventors: Akio Matsumoto, Neyagawa; Koichi Inazumi, Amagasaki; Kazuhiro Araki, Hirakata, all of Japan

[73] Assignee: Matsushita Electric Works, Ltd., Osaka, Japan

[21] Appl. No.: 297,621

[22] Filed: Aug. 31, 1981

[30] Foreign Application Priority Data

Sep. 12, 1980 [JP] Japan ................................ 55-126807

[51] Int. Cl.³ .............................................. G04F 5/00
[52] U.S. Cl. .................................... 368/160; 368/158; 310/40 MM
[58] Field of Search ................... 310/49, 40 MM, 162, 310/163, 156; 368/156, 157, 160, 259, 260, 107

[56] References Cited

FOREIGN PATENT DOCUMENTS 53-26910 3/1978 Japan ............................... 310/49 R
55-97173 7/1980 Japan ............................... 310/49 R Primary Examiner—Bernard Roskoski
Attorney, Agent, or Firm—King and Liles

[57] ABSTRACT

A step motor comprising a stator made by bending a bar-shaped and magnetically highly permeable material into a substantially U-shape which is straight in one leg and curved in the other leg so that the magnetic flux distribution accompanying the curved leg will have a single ridge and the nearest and second nearest distances $g_1$ and $g_2$ of the curved leg from a rotor and the distance $g_3$ between the straight leg and the rotor will maintain such relations as $1.2 \leq g_2/g_1 \leq 1.8$ and $2.1 \leq g_3/g_1 \leq 3.5$, the stator being secured to a main plate as inserted at the curved leg partly into a groove made in the main plate. A part of the curved leg defining the distance $g_1$ is made to be a tip end part of the curved leg, the width at a part of the groove in which the tip end part of the curved leg is inserted to be secured to the main plate is made to be of the stator width and the groove width at other parts is made comparatively larger than the stator width. A bearing for the rotor shaft is formed integrally with the main plate to easily reliably achieve the distance relations. A quartz clock using the step motor is provided by arranging a gear train on the same main plate of the step motor.

22 Claims, 7 Drawing Figures

| $g_1$: | 0.6 | 0.7 | 0.8 | 0.9 | 1.0 |
| $g_2$: | 1.0 | 1.1 | 1.2 | 1.3 | 1.4 |
| $g_3$: | 2.1 | 2.2 | 2.3 | 2.4 | 2.5 |

STEP MOTOR

This invention relates to step motors and quartz clocks using the same.

In a conventional step motor or particularly a step motor for a quartz clock, a stator generally comprises, as shown in FIG. 1, three parts 1', 1" and 1'" made by punching a plate material, the part 1' is straight and is used as a core of a coil 2' wound thereon, and the other parts 1" and 1'" respectively formed in L-shape are arranged to engage at one end with each of the both longitudinal ends of the part 1' while respective the other ends are closely opposed to each other as somewhat displaced around a rotor 3'. In order to secure these members in position, three pairs of supporting pillars 5', 5" and 5'" are erected on a main plate 4', holes made in the both ends of the straight stator part 1' are fitted to the pair of pillars 5', the L-shaped stator parts 1" and 1'" are fitted respectively to the respective pairs of supporting pillars 5', 5" and 5'", and the rotary shaft of the rotor 3' arranged between the other ends of the parts 1" and 1'" is inserted in a bearing 6' on the main plate 4'. With this arrangement, however, a large amount of scraps has been produced in making the stator members by punching the plate material, and the material efficiency and reduction of production cost accompanying an expensive material have been unable to be attained. As the straight part 1' and respective L-shaped parts 1" and 1'" are separately formed and are then joined together when the stator is assembled, there has been a defect that the magnetic resistance is high. In addition, from the necessity of keeping the positional relations of the stator to the rotor high in the precision, it has been necessary to ensure high positional and dimensional precisions of the supporting pillars 5', 5" and 5'" erected on the main plate 4'. As the stator is formed of the three parts, further, its assembling work has been complicated and, as the respective parts of the stator must be fitted to many supporting pillars, the assembling work has been complicated.

In order to eliminate these defects of the conventional step motor of FIG. 1, there has been suggested, for example, a Japanese patent application laid-open publication No. 26910/1978. In this case, as shown in FIG. 2, a substantially U-shaped and integral stator 7' is formed by punching a plate material so as to be straight in one leg but to have two projections in the other leg for providing two magnetic poles in the stator 7'. This allows the stator 7' to be made as an integral part, that is to have no connecting part at all, and the magnetic resistance can be reduced and, in addition, the work efficiency can be improved by the reduction of the number of parts. However, as will be evident from FIG. 2, it has been still necessary to fit the other leg of the stator 7' at two positions to supporting pillars made on the main plate (note attachment holes) and thus the assembling work has not been simplified in this respect. Further, as the stator is formed by punching, scraps are still produced and the material efficiency is kept low.

A further suggestion has been made to eliminate the defects of these motors of FIGS. 1 and 2 in a Japanese patent application laid-open publication No. 97173/1980, in which case, as shown in FIG. 3, a bar material circular in the cross-section is cut to be of a proper length and is bent to be a substantially U-shaped stator 8', which is straight in one leg but is curved in the other leg. The curving of the other leg of this stator 8' (FIG. 3) is such that, in an assembled relationship, a first direction in which the curved leg is the closest to a rotor 9' (FIG. 3) is different from a second direction in which the straight leg is the closest to the rotor 9' so as not to align with each other with respect to the rotary axis of the rotor, whereby to to determine the rotating direction of the rotor 9'. With this arrangement the production of scraps of the stator material can be made substantially nil and the punching work can be avoided to achieve improvements in the working and material efficiencies, but it has been impossible to achieve a stable rotation and sufficient rotary torque as a step motor. The problem has now been identified in that the precise spacing relationships of the respective stator legs to the rotor are not taken into consideration with respect to the generated torque of the motor.

A primary object of the present invention is, therefore, to provide a step motor wherein the punching work at the time of marking the stator can be avoided, the production of scraps can be made substantially nil and a stable rotation and sufficient rotary torque can be obtained.

Another object of the present invention is to provide a step motor wherein said positional relationship between the stator and the rotor that achieves an optimumly stable rotation of the rotor and thus generates a sufficient rotary torque can be attained.

A related object of the present invention is to provide a step motor wherein the stable rotation and sufficient rotary torque are well attained and yet the stator assembling work can be performed easily and quickly.

A further object of the present invention is to provide a quartz clock wherein the stator assembling work can be made easy and quick and yet the positional precision of the stator and rotor can be well improved.

Other objects and advantages of the present invention shall be made clear to the following descriptions of the invention detailed with reference to a preferred embodiment shown in accompanying drawings, in which.

Figure 1:
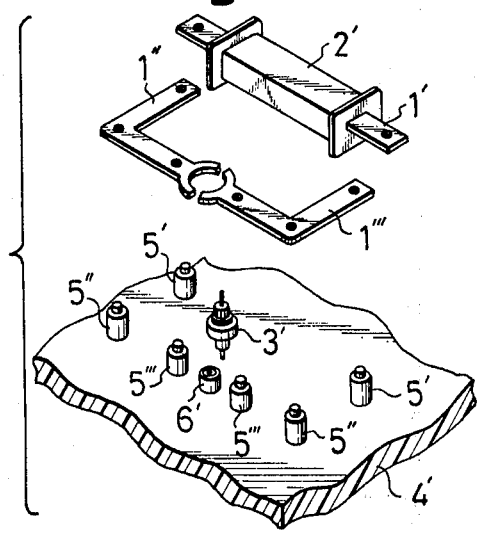
FIG. 1 is a perspective view as disassembled of a conventional step motor.
Figure 2:
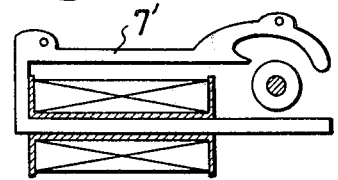
FIG. 2 is a plan view with a part sectioned of another conventional step motor.
Figure 3:
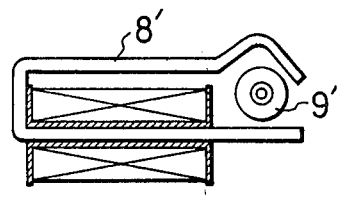
FIG. 3 is a plan view similar to FIG. 2 of still another conventional step motor.

While the step motor of the present invention shall be explained in the following description with reference to the most preferred embodiment shown in the drawings, the intention is not to limit the invention only to the particular embodiment but is to include all possible modifications, alterations and equivalent arrangement in the scope of appended claims. Further, while a quartz clock utilizing the step motor of the present invention shall be also explained, it should be understood that possible application of the step motor of the present invention is not limited only to the quartz clock.

Figure 4:
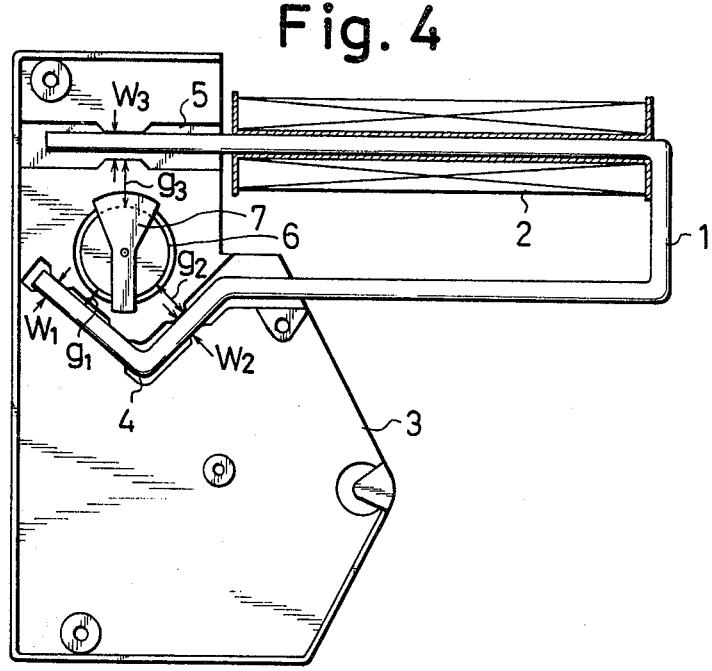
FIG. 4 shows in a plan view with a part sectioned and as magnified of a step motor of the present invention wherein the stator and rotor are assembled by means of a main plate for a quartz clock for the convenience of the following descriptions.
Figure 5:
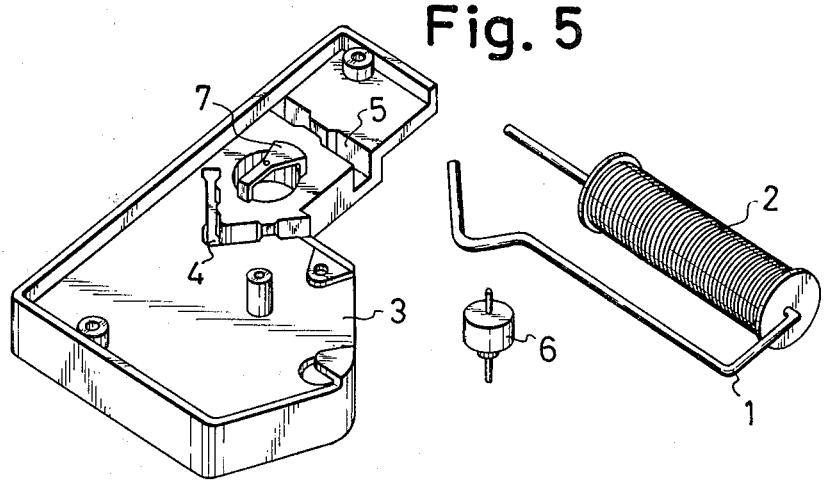
FIG. 5 is a perspective view as disassembled of the step motor shown in FIG. 4.

Referring now to FIGS. 4 and 5, a stator 1 is made by properly cutting a material bar-shaped and having a high magnetic permeability into a proper length and bending it into a substantially U-shape, one leg of which being curved at the tip end portion into a V-shape in the present case and the other leg of which being made straight. A coil 2 wound on a separately prepared bobbin is fitted onto the straight leg of the stator 1. The curved leg of the stator 1 is placed in a first groove 4 made in a main plate 3 to have substantially the same shape as the curved leg, while the straight leg is placed in a second groove 5 made straight also in the main plate 3. A rotor 6 is disposed in a space between the respective tip end portions of the two legs in the present instance of the stator 1, with the rotary shaft of the rotor rotatably supported in a bearing part 7 formed integrally with the main plate 3.

If the mutually closest distance forming a gap between the outer tip end part or portion of the curved leg of the stator 1 and the periphery of the rotor 6 is made $g_1$, the closest distance forming a gap between the inner base part or portion also of the curved leg and the rotor periphery is made $g_2$ and the closest distance forming a gap between the straight part or portion of the stator 1 and the rotor periphery is made $g_3$ and these distances are set to be $g_3 > g_1$ and $g_2$, a magnetic pole of the rotor 6 will be attracted in a stationary state by the part of the stator 1 corresponding to $g_1$ or $g_2$, and, therefore, the starting direction of the step motor of the present invention can be made constant. In the case where the relationship between the distances $g_1$ and $g_2$ is $g_1 > g_2$, these distance $g_1$ and $g_2$ in the following descriptions may be considered as replaced with each other. Therefore, references shall be made to the case of $g_3 > g_2 > g_1$ in the following description. There are shown in the following table the lower limit values and upper limit values of stable rotation voltages in the respective cases of $g_1 = 0.6$, 0.8 and 1.0 mm; $g_2 = 1.0$, 1.2 and 1.4 mm; and $g_3 = 2.1$ and 2.5 mm. The "lower limit value" of the stable rotation voltages is a voltage at which the rotor 6 begins to rotate while the voltage applied to the coil 2 is gradually increased, and the "upper limit value" of the stable rotation voltages is a voltage at which the rotor 6 stops the rotation while the applied voltage to the coil 2 is further increased. Therefore, it is necessary to select the lower limit and upper limit values of the stable rotation voltages and also the values of $g_1$, $g_2$ and $g_3$ in response to the driving voltage value applied to the coil 2. That is, the values of $g_1$, $g_2$ and $g_3$ should be so selected that the driving voltage value applied to the coil 2 will be intermediate between the lower limit value and the upper limit value of the stable rotation voltages. In the step motor of the present invention, it is preferable that the lower limit value will be less than about 1.15 volts and the upper limit value will be larger than about 1.6 volts when the motor is driven by a direct current source of, for example, 1.5 volts. In other words, it is preferable to achieve such ratio as $1.2 \leq g_2/g_1 \leq 1.8$ and $2.1 \leq g_3/g_1 \leq 3.5$. The experimental values in the table are obtained by utilizing the rotor 6 of a dish having a diameter of 6.5 mm and thickness of 2 mm and made of a ferrite series magnet.

| $g_2$ (mm) | $g_3$ (mm) | $g_1$ (mm) 0.6 | 0.8 | 1.0 |
|---|---|---|---|---|
| 1.0 | 2.1 | 1.1–2.25V $g_2/g_1 = 1.67$ $g_3/g_1 = 3.5$ | 0.9–2.15V $g_2/g_1 = 1.25$ $g_3/g_1 = 2.63$ | 0.87–1.16V $g_2/g_1 = 1.0$ $g_3/g_1 = 2.1$ |
| 1.0 | 2.5 | 1.15–2.2V $g_2/g_1 = 1.67$ $g_3/g_1 = 4.17$ | 0.88–2.0V $g_2/g_1 = 1.25$ $g_3/g_1 = 3.13$ | 0.88–1.3V $g_2/g_1 = 1.0$ $g_3/g_1 = 2.5$ |
| 1.2 | 2.1 | 1.2–2.24V $g_2/g_1 = 2.0$ $g_3/g_1 = 3.5$ | 0.9–2.1V $g_2/g_1 = 1.5$ $g_3/g_1 = 2.63$ | 0.88–1.6V $g_2/g_1 = 1.2$ $g_3/g_1 = 2.1$ |
| 1.2 | 2.5 | 1.24–2.3V $g_2/g_1 = 2.0$ $g_3/g_1 = 4.17$ | 0.92–2.09V $g_2/g_1 = 1.5$ $g_3/g_1 = 3.13$ | 0.88–1.7V $g_2/g_1 = 1.2$ $g_3/g_1 = 2.5$ |
| 1.4 | 2.1 | 1.25–2.32V $g_2/g_1 = 2.33$ $g_3/g_1 = 3.5$ | 1.08–2.2V $g_2/g_1 = 1.75$ $g_3/g_1 = 2.63$ | 0.97–1.6V $g_2/g_1 = 1.4$ $g_3/g_1 = 2.1$ |
| 1.4 | 2.5 | 1.27–2.4V $g_2/g_1 = 2.33$ $g_3/g_1 = 4.17$ | 1.08–2.2V $g_2/g_1 = 1.75$ $g_3/g_1 = 3.13$ | 0.95–2.0V $g_2/g_1 = 1.4$ $g_3/g_1 = 2.5$ |

In the case when $g_1$ is more than 0.6 to 1.0 mm, further, the stable rotation and sufficient rotary torque can be well attained so long as the values of $g_2$ and $g_3$ with respect to $g_1$ are selected be of the foregoing ratio after $g_1$ is determined.

Figure 6:
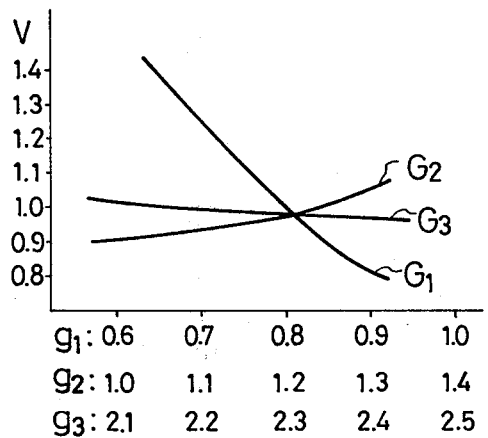
FIG. 6 is a diagram showing operational characteristics of the step motor of the present invention shown in FIGS. 4 and 5.

Further, in the step motor of the present invention, there are such relations as in FIG. 6 on the starting voltage when $g_1$, $g_2$ and $g_3$ are varied respectively individually. Therefore, the experiments in the above table were made with the values of $g_1$, $g_2$ and $g_3$ on both sides of their middle values of 0.8, 1.2 and 2.3 mm, respectively. If the dimensions and materials of the rotor and stator are altered and the driving voltage value is varied, the dimensions of $g_1$, $g_2$ and $g_3$ will be of course other values than those referred to, but the ratio between $g_1$, $g_2$ and $g_3$ will be maintained and, accordingly, it is the requirement for the step motor of the present invention to hold the above described ratios of $1.2 \leq g_2/g_1 \leq 1.8$ and $2.1 \leq g_3/g_1 \leq 3.5$.

According to FIG. 6, in the step motor of the present invention, a starting voltage $G_1$ corresponding to $g_1$ is larger in the absolute value of the gradient than starting voltages $G_2$ and $G_3$ corresponding respectively to $g_2$ and $g_3$. Therefore, it will be clear that, if $g_1$ is set more precisely than $g_2$ and $g_3$, a step motor of a higher efficiency will be obtained. In the present invention, the stator part corresponding to $g_1$ is made the curved tip end part of the stator 1 and the width $W_1$ of the curved groove 4 of a groove means of the base plate 3 in which this curved tip end part is fitted is made to coincide with the width of the inserted part of the stator 1 more precisely than the widths $W_2$ and $W_3$ of the grooves 4 and 5 of the groove means of the main plate 3 corresponding respectively to $g_2$ and $g_3$, whereby the precision required for properly setting the dimension of $g_1$ can be made high and the assembling work of the stator 1 into the main plate 3 can be quickly performed. In order to set the groove width $W_1$ to be the distance $g_1$ at a high precision, a holding projection is formed preferably on a side wall of the groove 4 so as to extend long in the lengthwise direction at a part of the groove holding the outer tip end portion of the stator 1. In the present invention, further, the bearing part 7 for the rotary shaft of the rotor 6 is formed integrally with the main plate 3 as has been referred to, whereby the distance $g_1$ can be set more easily and precisely. By expanding the curved groove 4 at the end part facing the tip of the stator and making the width $W_2$ corresponding to $g_2$ and the width $W_3$ of the straight groove 5 larger than the stator width, the stator 1 may be inserted first at the tip end into the expanded end part of the curved groove 4, then at the outer and inner tip end parts sequentially into the curved groove 4, and finally at the straight leg into the straight groove 5 of the main plate 3 against the own resiliency of the stator. Thus, in the step motor of the present invention, the assembling work can be made very easy and quick. In addition, as the cross-section of the stator 1 is made circular, a snapping action can be utilized in the assembling work of the stator 1 into the grooves 4 and 5 of the main plate 3 so as to render the work remarkably easy and the holding of the stator sufficiently reliable.

Figure 7:
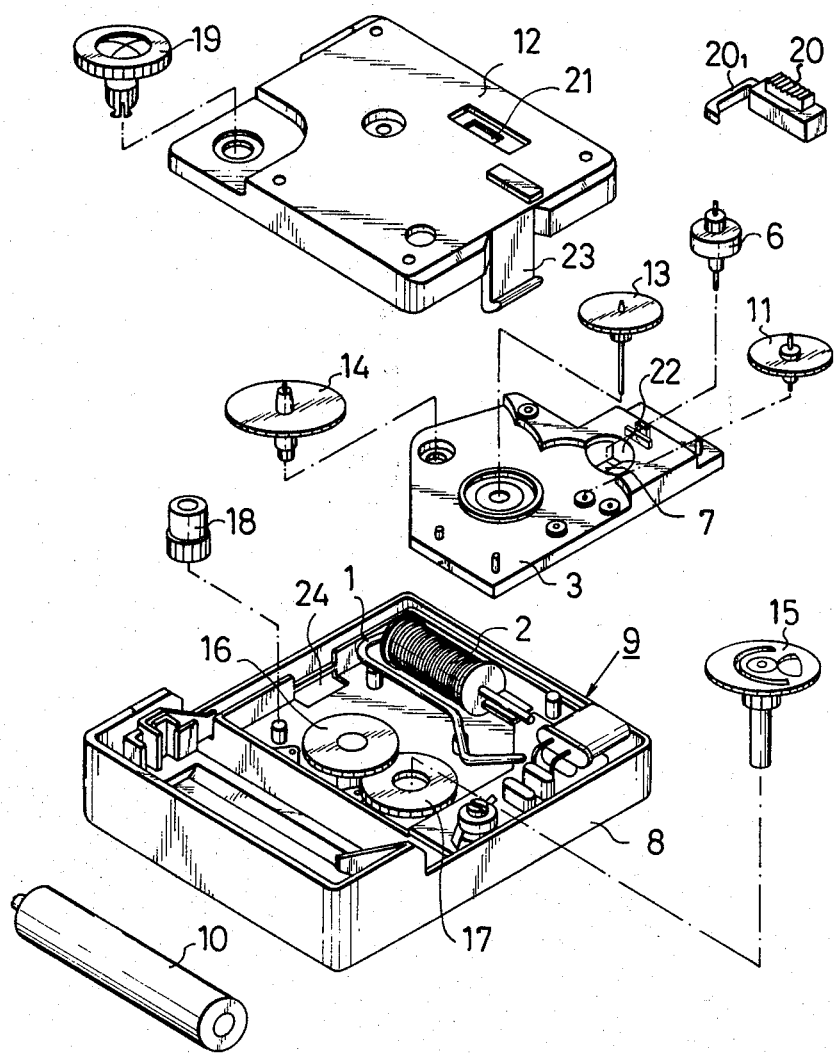
FIG. 7 is a perspective view as disassembled of a quartz clock incorporating the step motor of the present invention shown in FIGS. 4 and 5.

Referring next to FIG. 7 showing a quartz clock utilizing the above described step motor of the present invention, the stator 1 is shown as removed from the main plate 3 and placed on a casing 8 simply for an easy review, but in practice the stator 1 is initially assembled in the main plate 3 as has been described and is then the assembly is fitted into the casing 8 so that the stator 1 will be supported by some pillows in the casing 8. A circuit block 9 providing a driving signal to the coil 2 is incorporated in the casing 8 and this circuit block 9 is driven by a battery 10 also housed in the casing 8, and the rotor 6 is intermittently operated with the excitation of the coil 2. In response to the intermittent operation of the rotor 6, a 2nd wheel 11, axially and rotatably supported between the main plate 3 and a back lid 12 fitted over the casing 8 and in mesh with the rotor 6, is intermittently rotated. The rotation of the 2nd wheel 11 is transmitted through its pinion part to a second wheel 13 also rotatably supported between the main plate 3 and the back lid 12 and having an output shaft passed through the main plate 3 and casing 8. The rotation of the second wheel 13 is then transmitted through its pinion part to a transmitting wheel 14 and further through its pinion part over to a center wheel 15 disposed on the other surface of the main plate 3 where the stator 1 is disposed and having an output shaft penetrating through the casing 8. The rotation of the center wheel 15 is transmitted through its pinion part to a minute wheel 16 and through its pinion part to an hour wheel 17 having an output shaft passed through the casing 8. A time setting wheel 18 driven manually through a time setting knob 19 disposed outside the back lid 12 is provided in the casing 8 as meshed with the minute wheel 16. A lock button 20 operatable also from the exterior of the back lid 12 through an aperture 21 of the lid is fitted to a projection 22 of the main plate 3 so that an arm $20_1$ will come into mesh at the tip with the pinion part of the rotor 6 to prevent its rotation. Resilient pawls 23 are provided at peripheral edges of the back lid 12 so as to be engaged into opposing corner slots 24 of the casing 8 when the lid 12 is fitted to the casing.

In the quartz clock utilizing the step motor of the present invention, as will be clear from the foregoing description, the stator 1 and rotor 6 can be mounted to the main plate 3 holding the gear train including the respective wheels 11, 13, 14, 15, 16 and 17, the number of the assembling steps can be reduced and the precision of the distances between the stator 1 and the rotor 6 can be simultaneously secured. Accordingly, the number of required parts for the step motor can be reduced and the stator material can be easily saved. In the step motor of the present invention, the stator can be formed by only cutting and bending a bar-shaped material so that the magnetic efficiency and the turns of the coil can be increased while keeping the size of the exciting coil very small as compared with the conventional step motors, whereby the quartz clock utilizing this step motor can be also made effectively small and light.

In bending one of the legs of the U-shaped stator of the step motor according to the present invention, it is preferable to have it curved so that the magnetic flux distribution accompanying the curved leg will have a single ridge. Yet, it is easy to bend the bar material, the curved bar of circular section can be smoothly inserted into the groove in the main plate, and the rotor can be stepwise driven smoothly, so that there are advantages that the productivity and operation precision of the quartz clock can be effectively improved.

What is claimed as our invention is:

1. A step motor comprising a stator made by bending a bar-shaped material of a high magnetic permeability substantially into a U-shape, one leg of which being straight, a coil arranged on said straight leg of said stator and a rotor arranged between the straight leg and the other leg of the stator, said other leg being curved so that the closest part forming a gap between said rotor and said curved leg of the stator is angularly positioned spaced from a line extending normal from the rotary axis of the rotor to the closest part of the straight leg, and wherein the minimum distance forming the gap between the straight leg of the stator and the rotor being larger than the minimum distance forming the gap between the curved leg and the rotor.

2. A step motor according to claim 1 wherein, in addition to said closest part, a second closest part is provided forming a gap between said curved leg of said stator and said rotor angularly positioned on the other side than that of the closest part with respect to said normal, and the minimum distance between the curved leg and the rotor at said second closest part is smaller than the said minimum distance between the straight leg and the rotor.

3. A step motor according to claim 2 wherein such relations as $1.23 \leq g_2/g_1 \leq 1.8$ and $2.1 \leq g_3/g_1 \leq 3.5$ are held in the minimum distance $g_1$ at said closest part between said curved leg and said rotor, the minimum distance $g_2$ at said second closest part between the curved leg and the rotor and the minimum distance $g_3$ between said straight leg and the rotor.

4. A step motor according to claim 3 wherein said rotor is made of a ferrite series magnet and has a diameter of about 6.5 mm and a thickness of about 2 mm.

5. A step motor according to claim 3 wherein the lower limit value of the stable rotation voltages of said rotor is not more than about 1.15 volts and the upper limit value is not less than about 1.6 volts.

6. A step motor according to claim 1 wherein both of said legs of said stator are secured in groove means made in a main plate, and said rotor is axially rotatably supported in a bearing formed integrally with said main plate.

7. A step motor according to claim 6 wherein the width $W_1$ at a part of said groove means of said main plate for securing said curved leg of said stator and corresponding to the closest part to the curved leg with a minimum distance $g_1$ is made to be of the width of the curved leg, and the width of the other part of the groove means is made larger than $W_1$.

8. A step motor according to claim 7 wherein said closest part between said curved leg of said stator and said rotor is formed in an outer tip end part of the curved leg.

9. A step motor according to claim 8 wherein the width $W_3$ of said groove means of said main plate for securing said straight leg of said stator is made larger than said width $W_1$.

10. A step motor according to claim 1 wherein said stator has a circular cross-section.

11. A step motor according to claim 1 wherein said curved leg provides a magnetic flux distribution having a single ridge.

12. A quartz clock comprising a driving electric current source; a circuit block connected to said current source and generating an intermittent signal; a step motor including a stator made by bending a bar-shaped material of a high magnetic permeability material substantially into a U-shape, one leg of which being straight, a coil arranged on said straight leg of said stator and excited by said intermittent signal and a rotor arranged between the straight leg and the other leg of the stator, said other leg being curved so that the closest part forming a gap between said rotor and said curved leg of the stator is angularly positioned spaced from a line extending normal from a rotary shaft of the rotor to the closest part of the straight leg; a gear train rotated by said rotary shaft of the rotor of said step motor; time indicating hands responsive to outputs of said gear train; and a main plate on which said step motor and gear train are arranged; and wherein the minimum distance forming the gap between the straight leg of the stator and the rotor being larger than the minimum distance forming the gap between the curved leg and the rotor.

13. A quartz clock according to claim 12 wherein, in addition to said closest part, a second closest part is provided forming a gap between said curved leg of said stator and said rotor angularly positioned on the other wide than that of the closest part with respect to said normal, and the minimum distance between the curved leg and the rotor at said second closest part is smaller than the said minimum distance between the straight leg and the rotor.

14. A quartz clock according to claim 13 wherein such relations as $1.2 \leq g_2/g_1 \leq 1.8$ and $2.1 \leq g_3 g_1 \leq 3.5$ are held in the minimum distance $g_1$ at said closest part between said curved leg and said rotor, the minimum distance $g_2$ at said second closest part between the curved leg and the rotor and the minimum distance $g_3$ between said straight leg and the rotor.

15. A quartz clock according to claim 14 wherein said rotor is made of a ferrite series magnet and has a diameter of about 6.5 mm and a thickness of about 2 mm.

16. A quartz clock according to claim 14 wherein the lower limit value of the stable rotation voltages of said rotor is not more than about 1.15 volts and the upper limit value is not less than about 1.6 volts.

17. A quartz clock according to claim 12 wherein both of said legs of said stator are secured in groove means made in said main plate and said rotor is axially rotatably supported in a bearing formed integrally with the main plate.

18. A quartz clock according to claim 17 wherein the width $W_1$ at a part of said groove means of said main plate for securing said curved leg of the stator and corresponding to the closest part to the curved leg with a minimum distance $g_1$ is made to be of the width of the curved leg, and the width of the other part of the groove means is made larger than $W_1$.

19. A quartz clock according to claim 18 wherein said closest part between said curved leg of said stator and said rotor is formed at an outer tip end part of the curved leg.

20. A quartz clock according to claim 18 wherein the width $W_3$ of said groove means of said main plate for securing said straight leg of said stator is made larger than said width $W_1$.

21. A quartz clock according to claim 12 wherein said stator has a circular cross-section.

22. A quartz clock according to claim 12 wherein said curved leg provides a magnetic flux distribution having a single ridge.

* * * * *